UNITED STATES PATENT OFFICE.

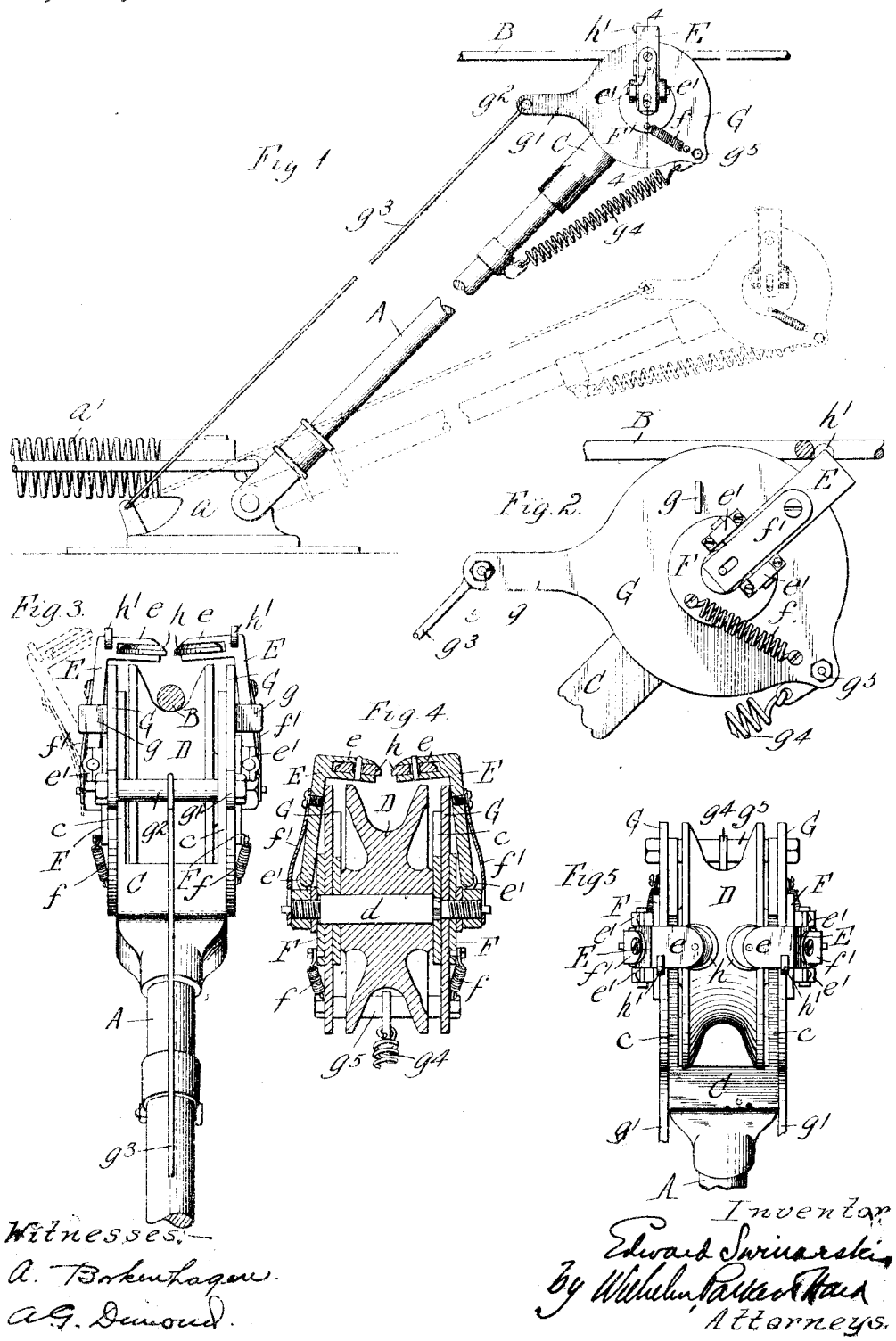

EDWARD SWINARSKI, OF BUFFALO, NEW YORK, ASSIGNOR OF TWO-FIFTHS TO WACLAW TULIMOWSKI, OF BUFFALO, NEW YORK.

TROLLEY.

1,059,011.

Specification of Letters Patent. Patented Apr. 15, 1913.

Application filed May 3, 1912. Serial No. 694,800.

*To all whom it may concern:*

Be it known that I, EDWARD SWINARSKI, a citizen of the United States, residing at Buffalo, in the county of Erie and State of New York, have invented a new and useful Improvement in Trolleys, of which the following is a specification.

This invention relates to improvements in trolleys for electric railroad cars or other vehicles of the kind which are provided with means for preventing the trolley from accidentally leaving the trolley wire.

The objects of the invention are to produce a thoroughly practical and desirable device of this kind of improved construction, which will insure the retaining of the trolley on the wire, but will not prevent the trolley from being readily placed on and removed from the trolley wire when desired;
also to mount the retaining device on the trolley pole in such a manner that it will readily yield to pass any crosswire, or switch plates, or other obstructions, and will automatically return to operative position after the obstructions are passed; also to improve devices of this kind in the respects hereinafter more fully specified.

In the accompanying drawings: Figure 1 is a fragmentary side elevation of a trolley pole, provided with a trolley retaining device embodying the invention. Fig. 2 is a side elevation of the trolley retaining device on an enlarged scale showing the parts thereof in a position to clear an obstruction.
Fig. 3 is a front elevation thereof showing the parts in their normal position. Fig. 4 is a sectional elevation thereof on line 4—4, Fig. 1. Fig. 5 is a plan view thereof.

Like reference characters refer to like parts in the several figures.

A represents the trolley pole which is pivoted at its lower end to the usual swiveled stand or turntable $a$ on the roof of a car, and which is pressed upwardly to hold the trolley in engagement with the trolley wire B by means of the usual spring $a'$. C represents a trolley harp or fork of any suitable construction which is secured on the upper end of the trolley pole and which has two arms $c$ to which a bearing pin $d$ for the trolley wheel D is secured. All of these parts may be of any suitable or usual construction and constitute no part of this invention.

The retaining device comprises two arms E E which are located at opposite sides of the trolley and which have inwardly and downwardly projecting end portions or hooks $e$ $e$ which normally extend toward each other above the trolley and overhang the trolley wire, so that when the trolley wheel tends to jump or slip off of the wire, the latter will strike one or the other of these portions and will thereby be retained in the groove of the trolley wheel. These arms are yieldingly held in their operative positions and are so mounted on the trolley pole as to permit them to swing rearwardly and also laterally to clear any crosswires, switch plates, trolley wire supports, or other obstructions. In the construction shown the arms are journaled in bearings $e'$ $e'$ formed on bearing plates or members F F, which are arranged to turn about the bearing pin $d$. Thus the retaining arms can be swung rearwardly by the turning of the members F about the bearing pin, and the lateral swinging of the arms is made possible by the bearings $e'$ $e'$. Suitable springs $f$ $f$ are adapted to return the members F and the arms E E to their normal positions after an obstruction has been passed, and the arms E E are pressed inwardly or toward each other and yieldingly held in their inner or normal positions by springs $f'$ $f'$. These springs $f'$ $f'$ are preferably leaf springs secured at their upper ends to the arms E E and bearing at their lower free ends on the ends of the bearing pin $d$.

Means are preferably provided for keeping the arms E E normally in a substantially upright position regardless of the changes in the inclination of the trolley pole. For this purpose stop plates G G are arranged between the opposite sides of the wheel and the bearing plates F to turn on the bearing pin $d$ and are provided with stops or projections $g$, against which the arms E E are normally held by the springs $f$. The stop plates are connected with the trolley stand by a suitable parallel link mechanism, whereby these plates will be swung more or less about the bearing pin $d$, so as to keep the arms E E in an upright position when the trolley pole swings up or down as required to hold the trolley on the wire. As shown, arms or extensions $g'$ are provided on the plates G, the ends of which are connected together by a cross bolt or pin $g^2$, to which is connected a wire or link $g^3$, extending substantially parallel with the trolley pole, and connected at its lower end to the stand or turntable $a$. This wire is kept taut by a tension spring $g^4$, which is connected at one end to the trolley pole and at its other end to a cross rod $g^5$ connecting the plates G G. By this means the plates G G will always maintain the arms E E in substantially upright position, notwithstanding changes in the inclination of the trolley pole.

In order to reduce the friction between the arms E E and any obstructions which these arms may encounter, rollers $h$ $h$ are journaled on the projecting end portions $e$ $e$ thereof, to turn about upright axes, and if desired, additional rollers $h'$ $h'$ arranged to turn about horizontal axes may be provided on the upper edge of the arms facing the direction of motion of the trolley, so that any crosswires or obstructions will easily push the arms either rearwardly or sidewise. The rollers $h'h$ preferably have upwardly facing beveled edges to facilitate the entrance of the trolley wire between them.

The retaining device is simple in construction, practical and reliable in action, and does not add materially to the weight and expense of the trolley.

The trolley is placed on the wire in the usual way. The inclination of the projecting portions of the arms and the beveled faces of the rollers $h$ will assist in centering the trolley with regard to the wire, and the arms will readily yield or separate to let the wire into the groove of the trolley. The arms are adapted to yield both laterally and rearwardly, either simultaneously or independently of each other. If there is an obstruction which strikes only the arm at one side of the trolley, this arm alone will yield and the other arm will retain its position over the wire, thus lessening the chance of the trolley leaving the wire. When the arms are released after passing an obstruction, the springs $f$ will return them to the upright position and the other springs $f'$ will allow them to yield outwardly sufficiently for their inturned upper ends to snap back into place over the trolley wire.

I claim as my invention:

1. The combination with a trolley pole and a trolley wheel journaled thereon, of retaining arms arranged at opposite sides of said trolley wheel and having portions which project inwardly over the trolley wheel, said retaining arms being pivotally mounted to swing in planes substantially parallel with the plane of revolution of the trolley wheel to pass obstructions and also toward and from the trolley wheel, means for yieldingly opposing both of said movements of the retaining arms and returning the arms to their normal position when moved therefrom, and means for shifting said arms in planes parallel with the trolley wheel relative to the trolley pole for maintaining the arms in substantially upright positions regardless of changes in inclination of the trolley pole, substantially as set forth.

2. The combination with a trolley pole and a trolley wheel journaled thereon, of retaining arms arranged at opposite sides of said trolley wheel and having portions which project inwardly over the trolley wheel, bearing members on which said arms are pivoted to swing toward and from the trolley wheel and which are mounted to swing independently of each other in planes substantially parallel with the plane of revolution of said trolley wheel, a frame movably mounted on the trolley pole and arranged to swing in planes substantially parallel with the plane of revolution of the trolley wheel, and means for yieldingly holding said arms in substantially upright positions regardless of changes in inclination of the trolley pole.

3. The combination with a trolley pole and a trolley wheel journaled thereon, of retaining arms arranged at opposite sides of said trolley wheel and having portions which project inwardly over the trolley wheel, said retaining arms being pivotally mounted to swing in planes substantially parallel with the plane of revolution of the trolley wheel and also toward and from the trolley wheel, a stop frame movably mounted on the trolley pole and having stops to limit the forward movement of said retaining arms relative to said stop frame, means which hold said retaining arms against said stops and allow the arms to yield rearwardly relative to said stop frame, and means for shifting said stop frame relative to the trolley pole for maintaining said arms in substantially upright positions when the trolley pole is moved vertically, substantially as set forth.

4. The combination with a trolley pole and a trolley wheel journaled thereon, of retaining arms arranged at opposite sides of said trolley wheel and having portions which project inwardly over the trolley wheel, bearing members on which said arms are pivoted to swing toward and from the trolley wheel and which are mounted to swing in planes substantially parallel with the plane of revolution of said trolley wheel, stop plates arranged to swing in planes substantially parallel with the plane of revolution of the trolley wheel and having stops, springs which hold said retaining arms yieldingly against said stops, and means for shifting said stop plates for maintaining said retaining arms substantially upright when the trolley pole is moved vertically, substantially as set forth.

5. The combination with a trolley pole and a trolley wheel journaled thereon, of retaining arms arranged at opposite sides of said trolley wheel and having portions which project inwardly over the trolley wheel, bearing members on which said arms are pivoted to swing toward and from the trolley wheel and which are mounted to swing independently of each other in planes substantially parallel with the plane of revolution of said trolley wheel, means for yieldingly pressing said retaining arms toward each other, a frame movably mounted on the trolley pole and arranged to swing in planes substantially parallel with the plane of revolution of the trolley wheel, and springs connecting said bearing members and said frame for holding said arms in substantially upright position, substantially as set forth.

Witness my hand this 27th day of April, 1912.

EDWARD SWINARSKI.

Witnesses:
  PETER C. JCZEWSKI,
  IGNACZ ROMASZKIMI.